US012810597B2

(12) United States Patent
Meng et al.

(10) Patent No.: US 12,810,597 B2
(45) Date of Patent: Nov. 24, 2026

(54) CONFUSION MATRIX CONSTRUCTION FOR IMPROVED DEEP LEARNING DEFECT DETECTION

(71) Applicant: UnitX, Inc., Santa Clara, CA (US)

(72) Inventors: Di Meng, Santa Clara, CA (US); Ruokun Ren, Redwood City, CA (US)

(73) Assignee: UnitX, Inc., Santa Clara, CA (US)

( * ) Notice: Subject to any disclaimer, the term of this patent is extended or adjusted under 35 U.S.C. 154(b) by 159 days.

(21) Appl. No.: 18/969,774

(22) Filed: Dec. 5, 2024

(65) Prior Publication Data

US 2026/0162411 A1 Jun. 11, 2026

(51) Int. Cl.

| | |
|---|---|
| ***G06V 10/776*** | (2022.01) |
| ***G06T 7/00*** | (2017.01) |
| ***G06V 10/26*** | (2022.01) |
| ***G06V 10/764*** | (2022.01) |
| ***G06V 10/774*** | (2022.01) |

(52) U.S. Cl.

CPC .......... *G06V 10/776* (2022.01); *G06T 7/0004* (2013.01); *G06V 10/26* (2022.01); *G06V 10/764* (2022.01); *G06V 10/774* (2022.01); *G06T 2207/20081* (2013.01)

(58) Field of Classification Search

CPC .... G06V 10/776; G06V 10/26; G06V 10/764; G06V 10/774; G06T 7/0004; G06T 2207/20081; G06T 2207/20084

See application file for complete search history.

(56) References Cited

U.S. PATENT DOCUMENTS

| | | | | |
|---|---|---|---|---|
| 12,675,871 | B2 * | 7/2026 | Chen | G06T 7/001 |
| 2022/0084181 | A1 * | 3/2022 | Isken | G01N 21/8851 |
| 2022/0374720 | A1 * | 11/2022 | Qu | G06N 3/088 |
| 2022/0392025 | A1 * | 12/2022 | Mironica | G06N 3/045 |
| 2023/0051895 | A1 * | 2/2023 | Winfree | B32B 37/06 |
| 2024/0097215 | A1 * | 3/2024 | Wegner | G01N 23/18 |
| 2025/0265700 | A1 * | 8/2025 | Chen | G06T 7/0008 |

FOREIGN PATENT DOCUMENTS

| | | | |
|---|---|---|---|
| CN | 116935092 A * | 10/2023 | G06T 7/0004 |

* cited by examiner

*Primary Examiner* — Qun Shen

(74) *Attorney, Agent, or Firm* — Schwegman Lundberg & Woessner, P.A.

(57) ABSTRACT

Performance of a defect detection model is evaluated on a per-label basis rather than per-pixel or per image basis, through a unique evaluation technique. For a label mask of an image (the ground truth of the image), computer vision is used to extract one or more contours from the mask and the same is done for the predicted mask. Exhaustive pairing is used where each ground truth contour is compared with each predicted contour using a new metric called intersection over prediction (IoP). If the IoP is above a threshold, then a true positive is recorded. If not, then another new metric called Intersection over Ground Truth (IoGT) is calculated and if it is above a threshold, then a true positive is recorded. If a ratio of unmatched ground truth area to total ground truth area is more than another threshold, the ground truth contour is a true positive.

20 Claims, 10 Drawing Sheets

CONFUSION MATRIX CONSTRUCTION FOR IMPROVED DEEP LEARNING DEFECT DETECTION

TECHNICAL FIELD

This application relates generally to machine learning. More particularly, this application relates to confusion matrix construction for improved deep-learning defect detection.

BACKGROUND

Machine learning can be used in a variety of applications to perform various classification actions on digital images. One such classification is to identify "defects" in items appearing in the digital images. For example, a manufacturer may capture images of a product or part on an assembly line and use a machine learning model to identify whether the product or part has a defect that necessitates correction or destruction of the product.

DETAILED DESCRIPTION

Figure 1:
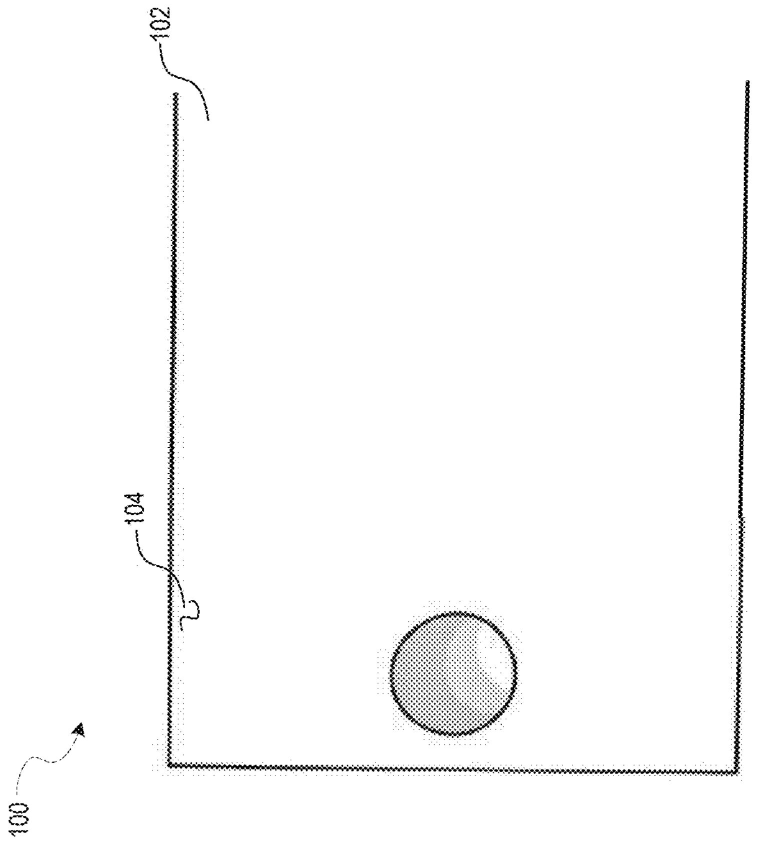
FIG. 1 is a diagram illustrating an image showing a product, in accordance with an example embodiment.

The description that follows includes illustrative systems, methods, techniques, instruction sequences, and computing machine program products that have illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Artificial intelligence techniques for detecting defects in items in digital pictures may involve the use of multiple different models that feed into each other. A segmentation model segments an image into smaller portions, typically grouped by common features. The portions may be called contours, as they often follow the shape of product or product portions. A classification model attempts to classify each of these contours and a defect detection model may predict whether the contours contain defects.

Training of a segmentation model involves using training data with a machine learning algorithm. The training data may be labeled (such as labeled with indications of which segments of each image in the training data are likely to have defects). The labels may be stored in the form of masks, which essentially are overlays on the image with areas of interest highlighted or marked in some way, as well as some classification (e.g., label) of the areas of interest. For example, a particular defect in a product in a sample image may be circled and classified as "defect", while the remaining part of the image showing the product may be classified as "non-defect" and any non-product part (e.g., part of an assembly line) of the image classified as "non-product." The machine learning algorithm then repeatedly modifies weights and other parameters in the segment model until it is "trained" to accurately predict the contours of interest in the training data. The output of each prediction made by the model is another mask, this one showing the predicted classes in the various areas. The model is essentially retrained over and over until it is reliable enough that the predicted masks match the label masks for each training image.

At that point, the segmentation model may be considered trained and can be used to evaluate images that have no labels (e.g., new images taken after the segmentation model has been trained). Furthermore, some of the "training data" may be held back and not actually used for training, but instead used for validation, such as to validate that the segmentation model has been properly trained after training. That data, while similar or identical to training data, may be termed "validation data."

The training of the defect detection model may follow a similar approach, with training data comprising segmented images (e.g., images with multiple identified contours from the segmentation models) and masks indicating whether the corresponding contours contain defects.

Evaluation of the reliability of a particular defect detection model, however, can be difficult. A confusion matrix may be used to evaluate the performance of the defect detection model. A confusion matrix is a matrix containing information about the actual and predicted classes. The matrix is two-dimensional and has as many rows and columns as there are classes. The columns represent the true classifications and the rows represent the predicted classifications. If the model performs perfectly, there will be scores only in the diagonal positions. Any misclassifications are placed in the off-diagonal cells. For example, the following is an example confusion matrix:

| | defect (actual) | non-defect (actual) | non-product (actual) |
|---|---|---|---|
| defect (predicted) | 93 | 5 | 5 |
| non-defect (predicted) | 4 | 90 | 6 |
| non-product (predicted) | 3 | 5 | 89 |

The numbers in the cells can be presented as either counts or percentages. Here they are depicted as percentages. Thus, for example, the top left cell indicates that when an actual defect was present that defect was correctly predicted 93% of the time.

Confusion matrices can also be thought of as assigning label values to the cells. More specifically, if one is trying to gauge the accuracy of predictions of a defect detection model, then the label values may include true positive (the defect detection model accurately predicted a defect when the ground truth showed a defect), false positive (the defect detection model inaccurately predicted a defect when the ground truth did not show a defect), true negative (the defect detection model accurately predicted no defect when the ground truth did not show a defect), and false negative (the defect detection model inaccurately predicted no defect when the ground truth showed a defect). These labels can apply, for example, in cases where the prediction is either a positive or a negative (like defect or non-defect, as opposed to also having non-product as a prediction). Thus, for example, in the following confusion matrix:

| | defect (actual) | non-defect (actual) |
|---|---|---|
| defect (predicted) | 90 | 15 |
| non-defect (predicted) | 10 | 85 |

the top left cell is a true positive cell, in which 90% of the defects were accurately predicted. The bottom left cell is a false negative cell, in which 10% of the defects were inaccurately predicted as not being defects. The top right cell is a false positive cell, in which 15 percent of non-defects were inaccurately predicted as defects. The bottom right cell is a true negative cell, in which 85% of non-defects were accurately predicted as non-defects.

In current implementations, however, for defect detection models, confusion matrices are inaccurate since they are constructed at either the pixel level or the image level. In other words, the presented accuracy can only be described based on whether a particular pixel was predicted accurately, or whether an image as a whole was predicted accurately, but neither effectively capture the reliability of the defect detection model.

Thus, incomplete data is presented to an evaluator. For pixel-level confusion matrices, if a particular pixel within a defect area is predicted accurately this does not necessarily mean that the defect detection model is working well if other pixels within the defect area are not predicted accurately. It also brings up a question of how many pixels within a defect area need to be predicted accurately in order to judge the defect detection model as being accurate.

Thus, if a prediction covers only part of the ground truth label, or a prediction covers way more area than the ground truth label does, how does one define whether the prediction is "accurate"?

When the confusion matrix is calculated at the image level, this assumes that one can come to a single accurate classification of the performance of the model on the image as a whole. While that may be true, for example, if there is a product with a single defect, but if the product has multiple defects, the truth about whether the image prediction as a whole is accurate is more fuzzy. The defect detection model could, for example, accurately predict one of the defects as a defect, and yet miss another of the defects.

Thus, construction of the confusion matrix at either the pixel level or the image level produces an inaccurate reflection of model reliability for defect detection models specifically.

In an example embodiment, performance of a defect detection model is evaluated on a per-label basis rather than per-pixel or per image, through a unique evaluation technique. For a label mask of an image (the ground truth of the image), computer vision is used to extract one or more ground truth contours from the label mask, and the same is done to extract one or more predicted contours for the predicted mask. Each contour is assigned a unique identification within the corresponding mask. Then all the ground truth contours are exhaustively paired with all the predicted contours.

A loop is then begun for each predicted contour. Specifically, at each iteration, the predicted contour is compared against all the ground truth contours. For each pairing, the contours are compared using a new metric called intersection over prediction (IoP). If the IoP is above a threshold, then a true positive classification is recorded for the predicted contour if the labels match. If the labels do not match, then a false positive classification is recorded for the predicted contour. In either case the contour is marked as having been matched with a contour in the label mask.

If the IoP is not above the threshold, then, another new metric called intersection over ground truth (IoGT) is calculated. If the IoGT is above another threshold, then the predicted contour is marked as having been matched with a ground truth contour. As will be seen, this means that this predicted contour will not be classified as a false positive. Rather it is classified as a true positive. This is because the metric indicates that a good portion of the ground truth contour is covered by this predicted contour.

It is then determined if the total amount of matched ground truth area (as a percentage of total ground truth area) is greater than or equal to a matched ground truth threshold. If so, then this ground truth label is marked as having been matched with a predicted contour and assigned a classification of true positive (if the underlying labels match) or false positive (if the underlying labels do not match).

These thresholds may all be different from each other or some or all of them may be the same.

This repeats until the predicted contour has been compared against all ground truth contours. Once that is done, it is determined if the predicted contour has been matched against any ground truth contours. If not, then the predicted contour is classified as a false positive.

The process then iterates and repeats the above for the next predicted contour. Once all predicted contours have been iterated, then any ground truth contour not marked as matched is classified as a false negative.

Figure 2:
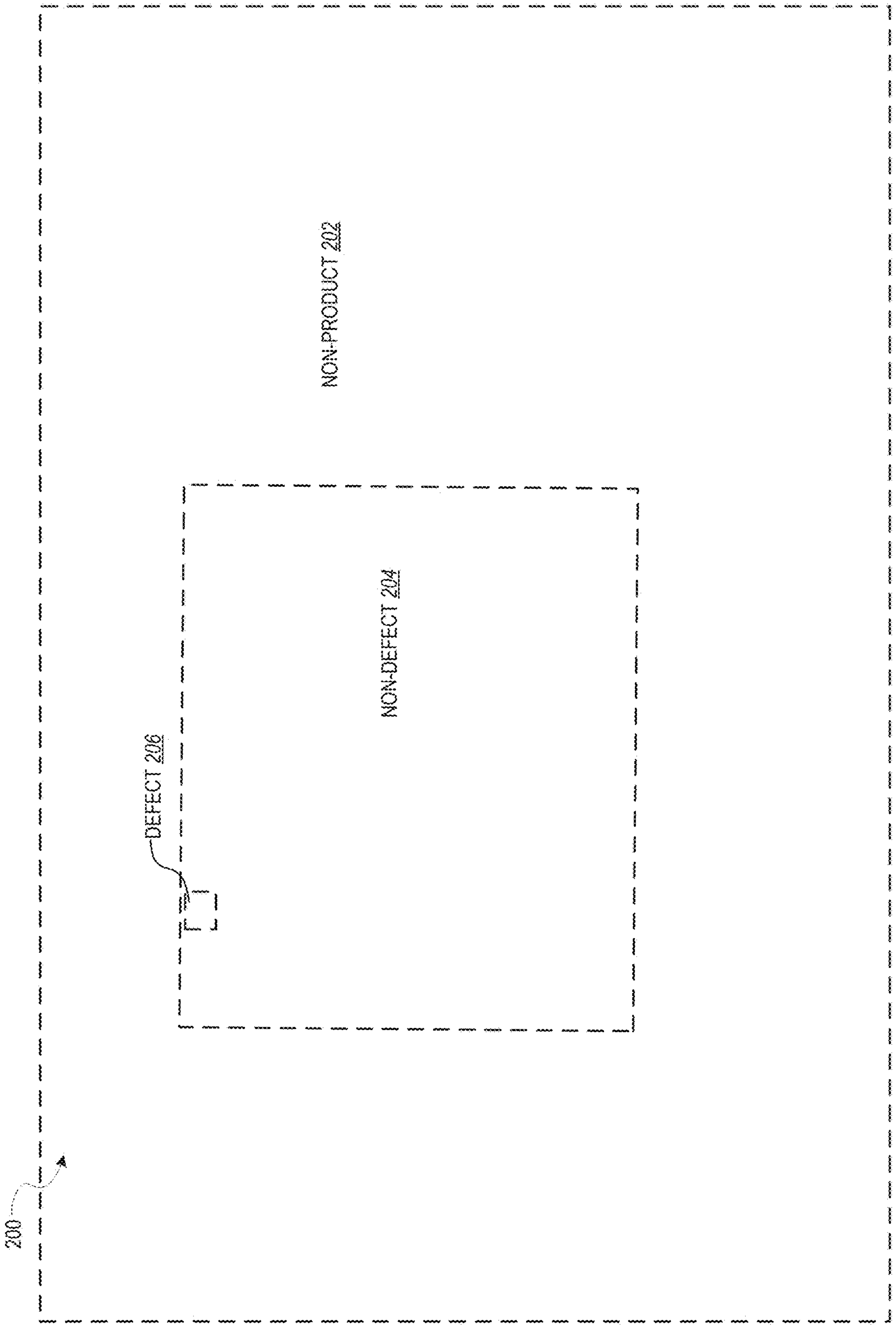
FIG. 2 is a diagram illustrating a mask over a product image, in accordance with an example embodiment.

FIG. 1 is a diagram illustrating an image 100 showing a product 102, in accordance with an example embodiment. Here, the product is shown to have a defect 104. FIG. 2 is a diagram illustrating a mask 200 over a product image, in accordance with an example embodiment. Specifically, the mask 200 delineates three portions. Each portion is depicted as bordered by dashed lines, which are not actually present in the mask but are provided to be able to tell where one portion ends, and another begins. The first portion 202 is labeled as "non-product", specifically the portion of the image that does not contain the product. The second portion 204 is labeled as "non-defect," specifically the portion of the image that contains the product but that representsnon-defective portion of the product. The third portion 206 is labeled as "defect," specifically the portion of the image that contains the defective portion of the product.

Figure 3:
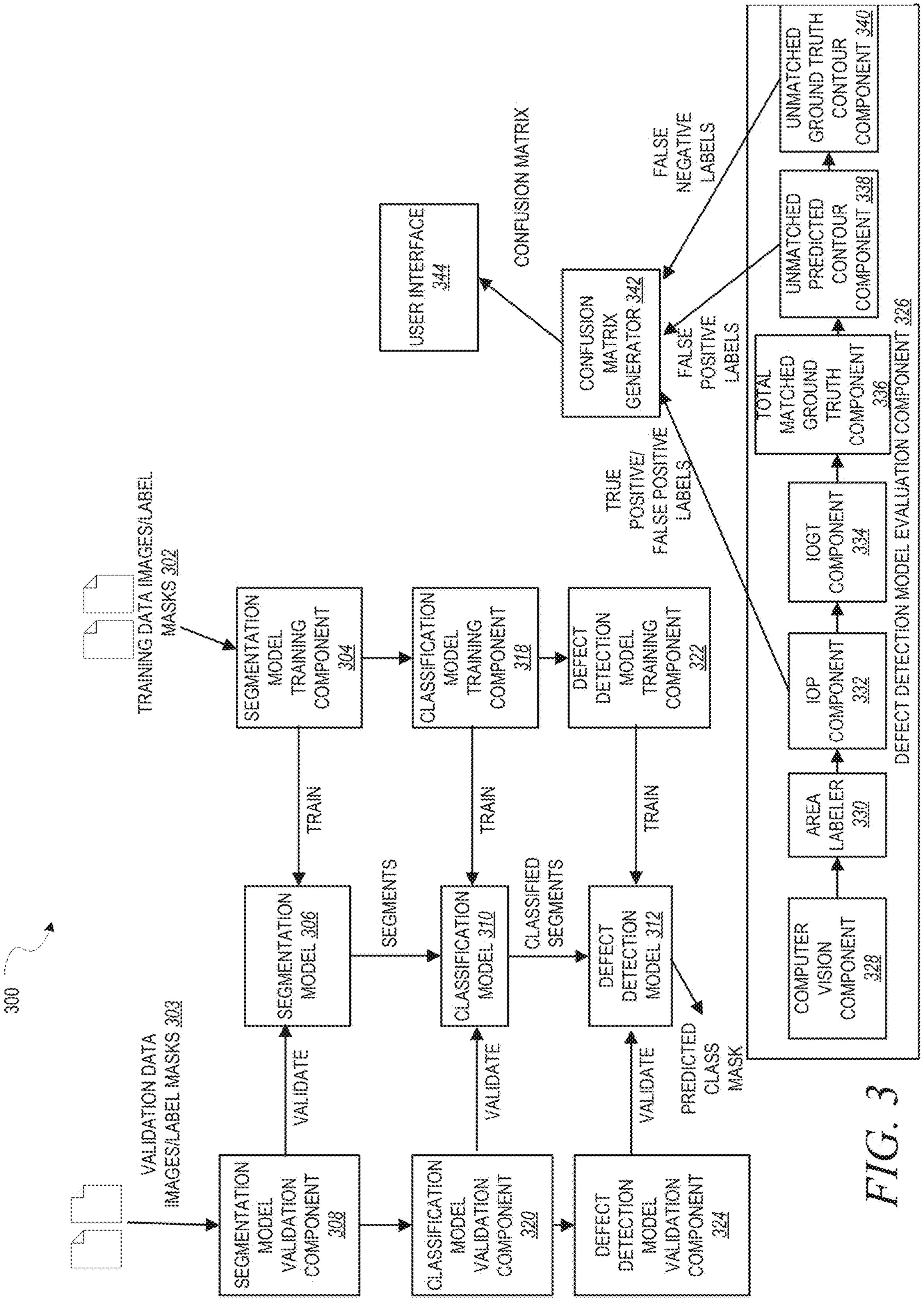
FIG. 3 is a block diagram illustrating a system for detecting defects in products, in accordance with an example embodiment.

FIG. 3 is a block diagram illustrating a system 300, in accordance with an example embodiment. One or more sample images and corresponding label masks (representing ground truth labels for areas of the images) are divided into training data images/label masks 302 and validation data images/label masks 303. The training data images/label masks 302 are passed to a segmentation model training component 304 to train a segmentation model 306. The validation data images/label masks 303 are then passed to a segmentation model validation component 308 to validate the segmentation model 306. Once validated, the segmentation model can then be used to evaluate actual product images and segment the actual product images into segments. A classification model 310 then classifies the segments and a defect detection model 312 detects one or more defects in the classified segments. Each of the classification model 310 and the defect detection model 312 are trained and validated in a similar way to the segmentation model 306. Specifically, the training data images/label masks 302 are passed to a classification model training component 318 to train the classification model 310. The validation data images/label masks 303 are then passed to a classification model validation component 320 to validate the segmentation model 306. Likewise, the training data images/label masks 302 are passed to a defect detection model training component 322 to train the defect detection model 312. The validation data images/label masks 303 then passed to a defect detection model validation component 324 to validate the defect detection model 312.

A defect detection model evaluation component 326 then evaluates the predicted class mask(s) against their corresponding label masks. More specifically, for each predicted class mask/label mask combination, a computer vision component 328 identifies one or more predicted contours in the predicted class mask and one or more ground truth contours in the corresponding label mask.

Computer vision is a field of artificial intelligence that enables computers to interpret and understand visual information from the world, similar to how humans see and interpret images. The process starts with capturing images or videos through cameras. Once an image is acquired, it often undergoes preprocessing, where it might be resized or enhanced to remove noise. Next, the system identifies key features in the image, such as edges, textures, or colors, which are crucial for understanding the content. This is followed by object detection and recognition, where algorithms locate and classify the objects within the image. Traditional methods like Haar cascades or more advanced techniques using convolutional neural networks (CNNs) can be employed to learn from labeled data. Segmentation also plays a vital role, as it involves dividing an image into meaningful parts, helping to distinguish between objects and their background. After analyzing the image, post-processing steps may refine the results to improve accuracy.

An area labeler 330 then assigns a unique identification, within the predicted class mask, to each of the one or more predicted contours, as well as a unique identification, within the label mask, to each of the one or more ground truth contours.

An IoP component 332 calculates IoP for each pairing of ground truth contour and predicted contour. This metric computes the total area that the two contours intersect over the total area of the predicted contour. A low value indicates that the prediction poorly matches the ground truth, which happens if the predicted contour is much larger than the ground truth contour or if only a small fraction of the predicted contour covers the ground truth. The IoP component 332 then generates a true positive classification for any predicted contour whose IoP metric is greater than a threshold, assuming the labels match. If the labels do not match, then a false positive classification is generated for the predicted contour.

If the IoP is not greater than the threshold, then an IoGT component 334 calculates an IoGT metric the corresponding ground truth contour-predicted contour pair. This is performed by identifying the areas where the predicted contour intersects the ground truth contour and dividing that by the size of the ground truth contour. Any predicted contour with an IoGT more than a threshold is marked as having been matched to a ground truth contour and thus will not have a false positive classification generated for it.

A total matched ground truth component 336 then determines if a total amount of matched ground truth contour (as a percentage of the ground truth contour size as a whole) is greater than a matched ground truth threshold. If so, then the corresponding ground truth contour is removed from an unmatched ground truth list if not already and assigned a true positive classification (assuming the underlying labels match)

Then, for each unmatched predicted contour, an unmatched predicted contour component 338 generates a classification of false positive for the corresponding unmatched predicted contour.

Finally, for each unmatched ground truth contour, an unmatched ground truth component 340 generates a classification of false negative for the corresponding unmatched ground truth contour.

The generated classifications are then passed to a confusion matrix generator 342. The confusion matrix generator 342 generates a confusion matrix for each contour. This may include, for example, adding up all of the true positive classifications and entering the percentage of true positive classifications to positive classifications as a whole, adding up all the false positive classifications and entering the percentage of false positive classifications to positive classifications as a whole, adding up all of the true negative classifications and entering the percentage of true negative classifications to negative classifications as a whole, and adding up all the false negative classifications and entering the percentage of false negative classifications to negative classifications as a whole. A user interface 344 may then present this confusion matrix to a user, to use as an evaluation tool as to the reliability of the defect detection model 312. More specifically, this can help users pinpoint problems in labeling, or labeling strategy/data imbalance.

The following is example pseudocode, in accordance with an example embodiment.

Find Contours for Prediction and Ground Truth Images

```
if we have no contours
  # note: for true negative ase, we have no contours (nothing labeled, nothing
detected)
  increment value at element at (0, 0) of the confusion matrix
  return
create a temporary matrix each for predictions and ground truth
assign each contour with a unique id
create unprocessed_gt_ids, to hold all the ids of the ground truth labels
```

-continued

```
create total_matched_gt_list with size equals to number of gt contours, initialize
with value 1.0
for each pred in prediction contours:
# note: handles true positive and false positive case
   set matched flag to false
   # loop through ground truth labels
   for each gt in ground truth labels
      calculate IoP, IoGt between pred and ground truth
      update total_matched_gt ratio for this gt
      if IoP > threshold:
         # we either have a true positive or a false positiveagainst
another class
         increment corresponding element in confusion matrix by 1
         set matched flag to true
         # note: this means we've detected a defect. either this defect
matches
         the ground truth # or the prediction wrongly labeled a defect
      else if IoGt > threshold
         # a good portion of gt is covered, thus we won't report this
prediction
         as false positive against background
         increment corresponding element in confusion matrix by 1
         set matched flag to true
      if total_matched_gt > total_matched_gt_threshold:
         # sufficient portion of this gt was predicted
         remove this ground truth from unmatched ground truth list if
not already
   if matched is false:
      # this means after comparing with all ground truth labels, we didn't
find a
      match for this prediction
      report this prediction as false positive against background
# handle the false negative cases
for gt in unprocessed_gt_ids:
      report gt as false negative
```

Figure 4:
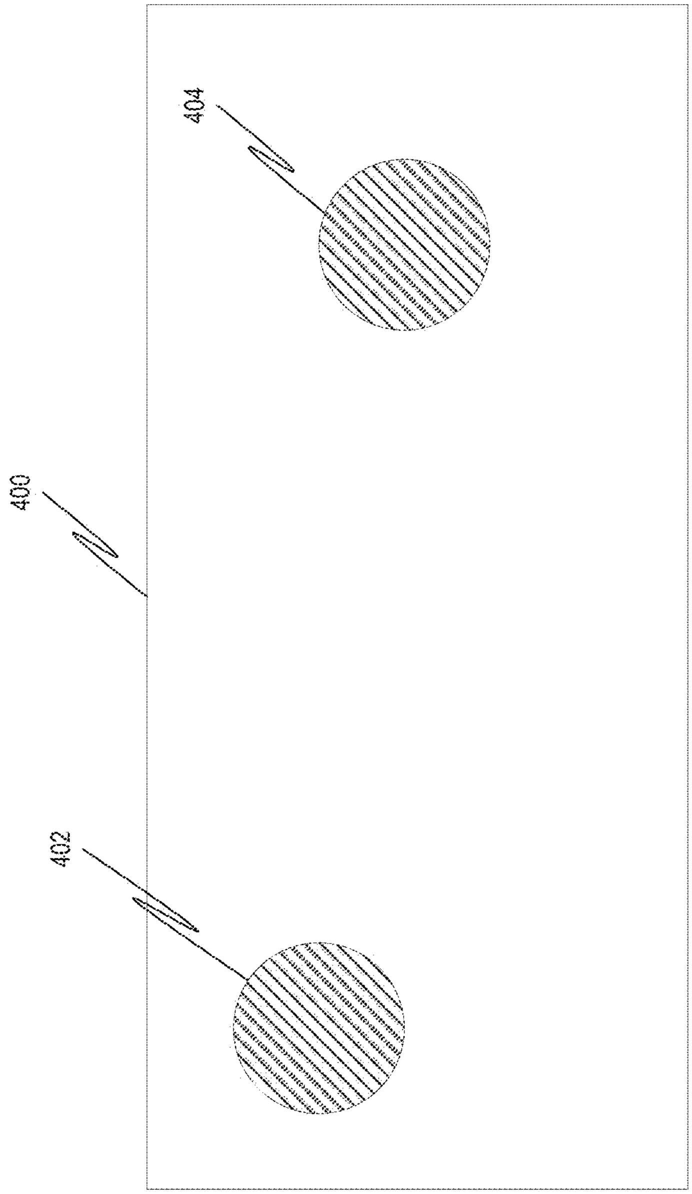
FIG. 4 is a diagram illustrating a first visual example of the comparison of contours of items in digital images, in accordance with an example embodiment.

FIG. 4 is a diagram illustrating a first visual example of the comparison of contours, in accordance with an example embodiment. A ground truth contour 400 may have an area of 180 square pixels, while a first predicted contour 402 may have an area of 10 square pixels and a second predicted contour 404 has an area of 15 square pixels. In this case, when the ground truth contour 400 is compared with the first predicted contour 402, the IoP is 10/10, which is obviously very high, and thus the first predicted contour 402 may be assigned a true positive classification. This assumes that the label for the first predicted contour 402 matches the label for the ground truth contour 400. If not, then the first predicted contour 402 is assigned a false positive classification. Since the IoP is greater than the threshold, no IoGT metric needs to be computed for the first predicted contour.

The same is true of the second predicted contour 404, which is also assigned a true positive classification and no IoGT metric needs to be computed. This assumes that the label for the second predicted contour 404 matches the label for the ground truth contour 400. If not, then the second predicted contour 404 is assigned a false classification label.

For the ground truth contour 400, however, only a small percentage of the ground truth contour 400 has been matched (25/180 square pixels). This is less than a matched ground truth threshold of 0.5, and thus the ground truth contour 400 may be assigned a classification of false negative.

Figure 5:
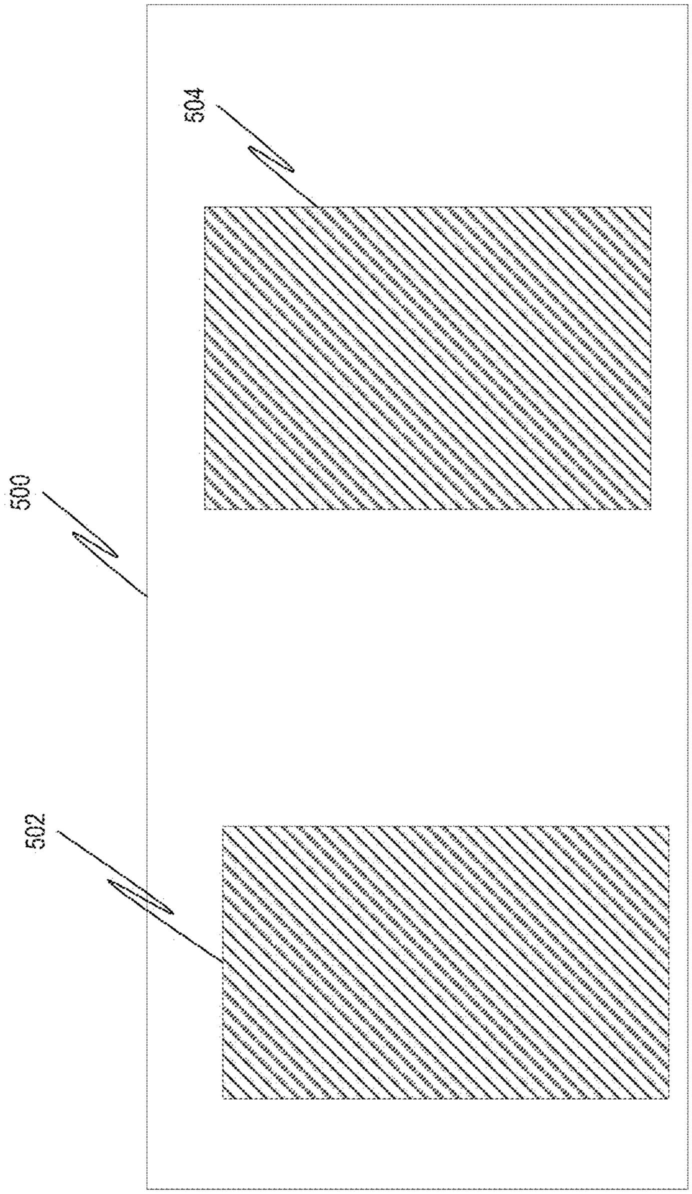
FIG. 5 is a diagram illustrating a second visual example of the comparison of contours, in accordance with an example embodiment.

FIG. 5 is a diagram illustrating a second visual example of the comparison of contours, in accordance with an example embodiment. Here, again, the ground truth contour 500 may have an area of 180 square pixels, but a first predicted contour 502 has an area of 60 square pixels, and a second predicted contour 504 has an area of 65 square pixels. Again, both the first predicted contour 502 and the second predicted contour 504 have high IoPs, so they may be assigned classifications of true positive or true negative. Here, however, for the ground truth contour 500, a high percentage of the ground truth contour 500 has been matched, meaning that no false negative should be assigned to the ground truth contour 500 since the matched percentage (125/180) is greater than the matched ground-truth threshold of 0.5 so instead a true positive is assigned (assuming, again, that the labels match, otherwise a false positive is assigned)

Figure 6:
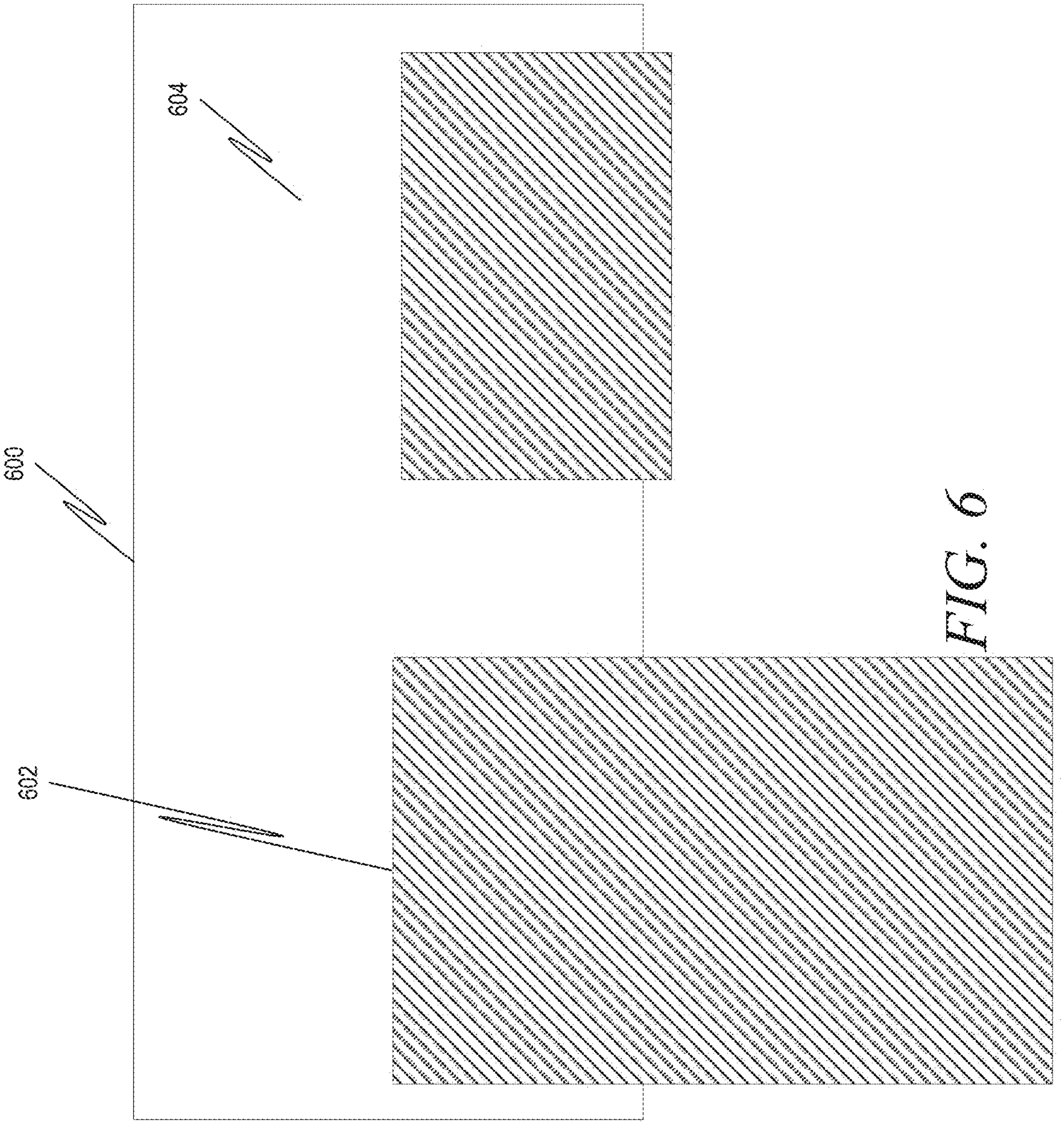
FIG. 6 is a diagram illustrating a third visual example of the comparison of contours, in accordance with an example embodiment.

FIG. 6 is a diagram illustrating a third visual example of the comparison of contours, in accordance with an example embodiment. Here, again, the ground truth contour 600 may have an area of 180 square pixels, but a first predicted contour 602 has an area of 200 square pixels, and a second predicted contour 504 has an area of 80 square pixels. The intersection of the first predicted contour 602 and the ground truth contour 600 is 50 pixels. The intersection of the second predicted contour 604 and the ground truth contour 600 is also 50 pixels.

For the first predicted contour 602, the IoP is below the threshold since 50/200<0.4. Thus, an IoGT calculation is performed. Here, the IoGT is 50/180, which is also below the threshold. Thus, this first predicted contour 602 will not be reported as a false positive but will be considered to be a match. The second predicted contour 604 has an IoP above the threshold since 50/80>0.4. Thus, the second predicted contour 604 will be assigned a classification of true positive or false positive, depending on whether its label matches the ground truth contour.

Here for the ground truth contour 600, a high percentage of the ground truth contour 600 has been matched, meaning that no false negative should be assigned to the ground truth contour 600 since the matched percentage (100/180) is greater than the matched ground truth threshold of 0.5 and thus it is assigned a true positive/false positive, depending upon whether the labels match.

Figure 7:
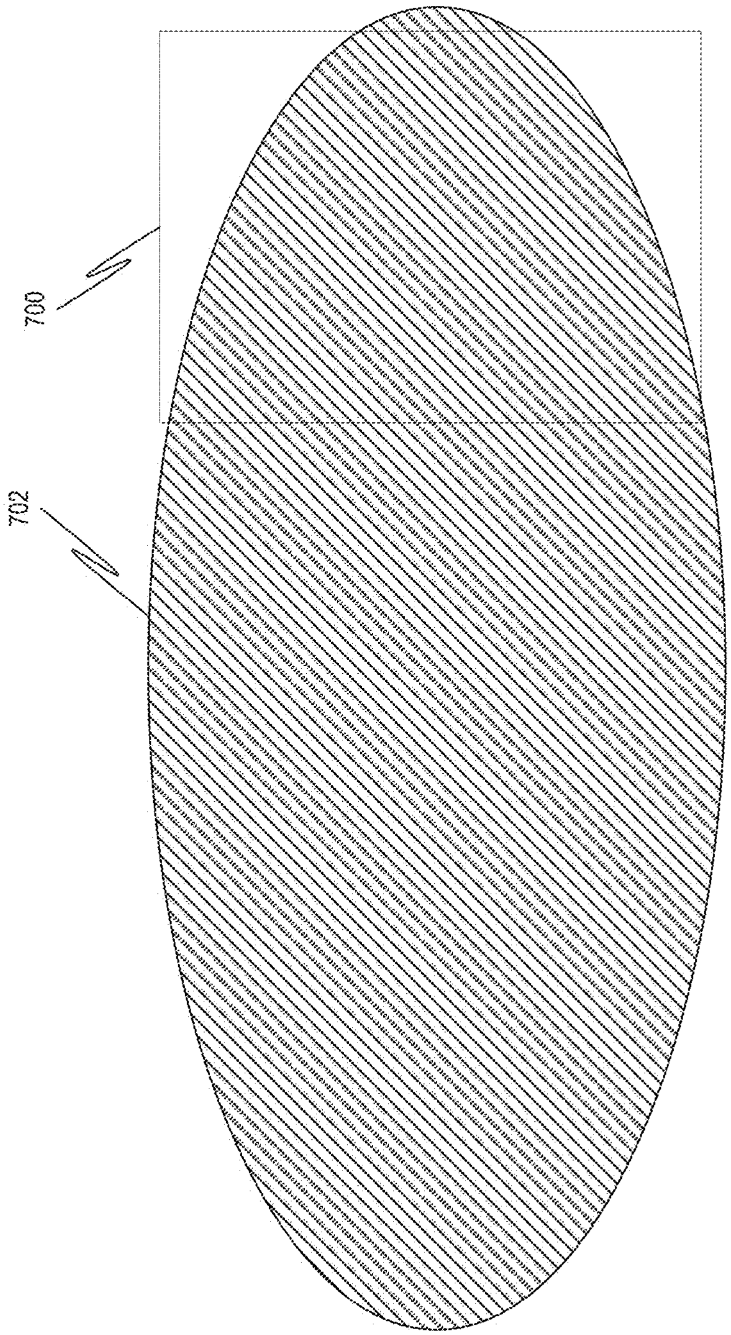
FIG. 7 is a diagram illustrating a fourth visual example of the comparison of contours, in accordance with an example embodiment.

FIG. 7 is a diagram illustrating a fourth visual example of the comparison of contours, in accordance with an example embodiment. Here, the ground truth contour 700 has a size of 100 pixels and the predicted contour 702 is much larger, at 600 pixels. The intersection between the two is 80 pixels. The result is that the IoP of the predicted contour 702 is 80/600, which is less than the 0.4 threshold. Thus, IoGT is computed. Here, the IoGT is 80/100, and thus the predicted contour will be assigned a classification of true positive (assuming the labels of the predicted contour 702 and ground truth contour 700 match).

Additionally, since a large percentage of the ground truth contour 700 has been matched, meaning that no false negative should be assigned to the ground truth contour 700 since the matched percentage (80/180) is greater than the matched ground truth threshold of 0.5 and thus it is assigned a true positive/false positive, depending upon whether the labels match.

Figure 8:
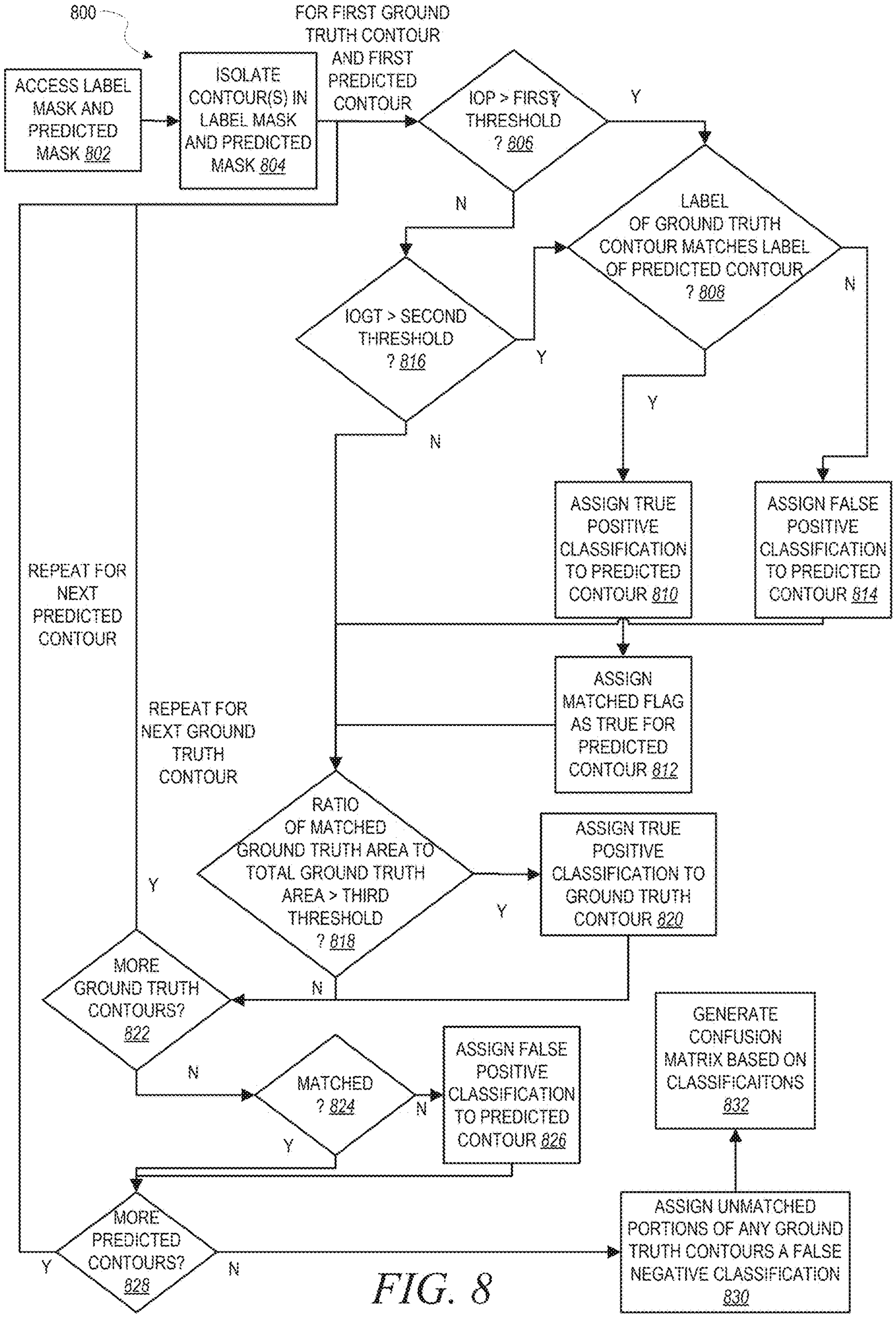
FIG. 8 is a flow diagram illustrating a method for evaluating performance of a defect detection machine learning model, in accordance with an example embodiment.

FIG. 8 is a flow diagram illustrating a method 800 for evaluating performance of a defect detection machine learning model in accordance with an example embodiment. At operation 802, a label mask and a predicted mask for a particular training image are accessed. At operation 804 contours in the label mask (called ground truth contours) and contours in the predicted mask (called predicted contours) are isolated. This may be performed using, for example, computer vision.

A loop is then begun for every ground truth contour and predicted contour. At operation 806, it is determined if the IOP for the corresponding ground truth contour and predicted contour exceeds a first threshold. If so, then at operation 808 it is determined if the label of the corresponding ground truth contour matches the label of the corresponding predicted contour. If so, then at operation 810 a true positive classification is assigned to the predicted contour. Then at operation 812 a matched flag for the predicted contour is assigned as true.

If at operation 808, it was determined that the label of the corresponding ground truth contour does not match the label of the corresponding predicted contour, then at operation 814, a false positive classification is assigned to the predicted contour.

If it was determined at operation 806 that the IOP for the corresponding ground truth contour and predicted contour does not exceed a first threshold, then at operation 816 it is determined whether the IOGT for the corresponding ground truth contour and predicted contour exceeds a first threshold. If so, then the method 800 moves to operation 808. If not, or once either operations 812 or 814 are completed, then at operation 818 it is determined if the ratio of matched ground truth area to total ground truth area exceeds a third threshold. If so, then at operation 820 a true positive classification is assigned to the corresponding ground truth contour.

If not, then at operation 822, it is determined if there are any more ground truth contours. If so, then the method repeats to operation 806 for the next ground truth contour. If not, then at then at operation 824 it is determined if the corresponding predicted contour got matched at all. If not, then at operation 826 it is assigned a false positive classification.

At operation 828, it is determined if there are any more predicted contours. If so, then the method repeats to operation 806 for the next predicted contour. If not, then at operation 830 any unmatched portions of any ground truth contours are assigned a false negative classification. Then, at operation 832, a confusion matrix is generated based on the classifications.

In view of the disclosure above, various examples are set forth below. It should be noted that one or more features of an example, taken in isolation or combination, should be considered within the disclosure of this application.

Example 1 is a system comprising: one or more image data sources; a computer system comprising at least one hardware processor and a non-transitory computer-readable medium storing instructions that, when executed by the at least one hardware processor, cause the at least one hardware processor to perform operations comprising: accessing a label mask for an image and a predicted mask for the image, the predicted mask generated by a defect detection machine learning model as an indicator of whether the image depicts a product having one or more defects, the label mask having labeled areas indicating one or more defects; isolating one or more ground truth contours in the label mask and one or more predicted contours in the predicted mask; for each predicted contour: for each ground truth contour: in response to a determination that an intersection over prediction metric for a corresponding ground truth contour and corresponding predicted contour transgresses a first threshold, matching the corresponding ground truth contour and corresponding predicted contour and assigning a true positive classification to the corresponding predicted contour; in response to a determination that a ratio of an unmatched area to a total area of the corresponding ground truth contour transgresses a second threshold, assigning a true positive classification to the corresponding ground truth contour; forming a confusion matrix using any true positive classifications assigned to any ground truth contours or predicted contours; and causing the confusion matrix to be displayed in a user interface.

In Example 2, the subject matter of Example 1 includes, wherein the isolation is performed using computer vision.

In Example 3, the subject matter of Examples 1-2 includes, wherein the operations further comprise: in response to a determination that the intersection over prediction metric does not transgress the first threshold, determining whether an intersection over ground truth metric for the corresponding ground truth contour and corresponding predicted contour transgresses a third threshold; and in response to a determination that the intersection over ground truth metric for the corresponding ground truth contour and corresponding predicted contour does not transgress a third threshold, assigning a true positive classification to the corresponding predicted contour.

In Example 4, the subject matter of Examples 1-3 includes, wherein the operations further comprise: assigning a false positive to any predicted contour whose label does not match a ground truth contour.

In Example 5, the subject matter of Examples 1-4 includes, wherein the confusion matrix displays a percentage of true positive labels to positive labels and a percentage of true negative labels to negative labels.

In Example 6, the subject matter of Examples 1-5 includes, wherein the operations further comprise retraining the defect detection model based on the confusion matrix.

In Example 7, the subject matter of Examples 1-6 includes, wherein the operations further comprise relabeling one or more label masks in training data based on the confusion matrix.

Example 8 is a method comprising: accessing a label mask for an image and a predicted mask for the image, the predicted mask generated by a defect detection machine learning model as an indicator of whether the image depicts a product having one or more defects, the label mask having labeled areas indicating one or more defects; isolating one or more ground truth contours in the label mask and one or more predicted contours in the predicted mask; for each predicted contour: for each ground truth contour: in response to a determination that an intersection over prediction metric for a corresponding ground truth contour and corresponding predicted contour transgresses a first threshold, matching the corresponding ground truth contour and corresponding predicted contour and assigning a true positive classification to the corresponding predicted contour; in response to a determination that a ratio of an unmatched area to a total area of the corresponding ground truth contour transgresses a second threshold, assigning a true positive classification to the corresponding ground truth contour; forming a confusion matrix using any true positive classifications assigned to any ground truth contours or predicted contours; and causing the confusion matrix to be displayed in a user interface.

In Example 9, the subject matter of Example 8 includes, wherein the isolation is performed using computer vision.

In Example 10, the subject matter of Examples 8-9 includes, in response to a determination that the intersection over prediction metric does not transgress the first threshold, determining whether an intersection over ground truth metric for the corresponding ground truth contour and corresponding predicted contour transgresses a third threshold; and in response to a determination that the intersection over ground truth metric for the corresponding ground truth contour and corresponding predicted contour does not transgress a third threshold, assigning a true positive classification to the corresponding predicted contour.

In Example 11, the subject matter of Examples 8-10 includes, assigning a false positive to any predicted contour whose label does not match a ground truth contour.

In Example 12, the subject matter of Examples 8-11 includes, wherein the confusion matrix displays a percentage of true positive labels to positive labels and a percentage of true negative labels to negative labels.

In Example 13, the subject matter of Examples 8-12 includes, retraining the defect detection model based on the confusion matrix.

In Example 14, the subject matter of Examples 8-13 includes, relabeling one or more label masks in training data based on the confusion matrix.

Example 15 is a non-transitory machine-readable storage medium having embodied thereon instructions executable by one or more machines to perform operations comprising: accessing a label mask for an image and a predicted mask for the image, the predicted mask generated by a defect detection machine learning model as an indicator of whether the image depicts a product having one or more defects, the label mask having labeled areas indicating one or more defects; isolating one or more ground truth contours in the label mask and one or more predicted contours in the predicted mask; for each predicted contour: for each ground truth contour: in response to a determination that an intersection over prediction metric for a corresponding ground truth contour and corresponding predicted contour transgresses a first threshold, matching the corresponding ground truth contour and corresponding predicted contour and assigning a true positive classification to the corresponding predicted contour; in response to a determination that a ratio of an unmatched area to a total area of the corresponding ground truth contour transgresses a second threshold, assigning a true positive classification to the corresponding ground truth contour; forming a confusion matrix using any true positive classifications assigned to any ground truth contours or predicted contours; and causing the confusion matrix to be displayed in a user interface.

In Example 16, the subject matter of Example 15 includes, wherein the isolation is performed using computer vision.

In Example 17, the subject matter of Examples 15-16 includes, wherein the operations further comprise: in response to a determination that the intersection over prediction metric does not transgress the first threshold, determining whether an intersection over ground truth metric for the corresponding ground truth contour and corresponding predicted contour transgresses a third threshold; and in response to a determination that the intersection over ground truth metric for the corresponding ground truth contour and corresponding predicted contour does not transgress a third threshold, assigning a true positive classification to the corresponding predicted contour.

In Example 18, the subject matter of Examples 15-17 includes, wherein the operations further comprise: assigning a false positive to any predicted contour whose label does not match a ground truth contour.

In Example 19, the subject matter of Examples 15-18 includes, wherein the confusion matrix displays a percentage of true positive labels to positive labels and a percentage of true negative labels to negative labels.

In Example 20, the subject matter of Examples 15-19 includes, wherein the operations further comprise retraining the defect detection model based on the confusion matrix.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 9:
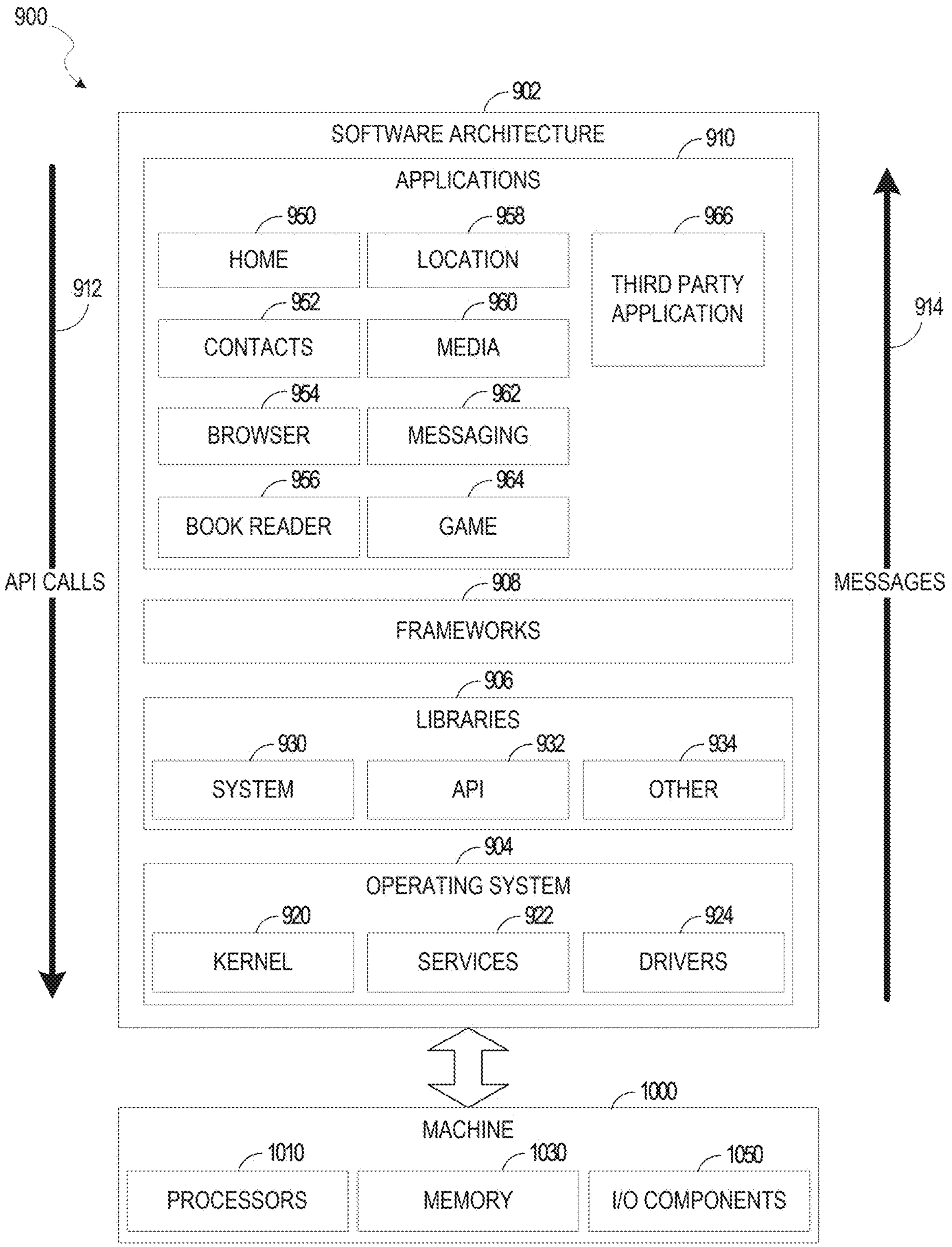
FIG. 9 is a block diagram illustrating a software architecture of the system for detecting defects in products, in accordance with an example embodiment.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke Application Program Interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 966 can invoke the API calls 912 provided by the operating system 904 to facilitate functionality described herein.

Figure 10:
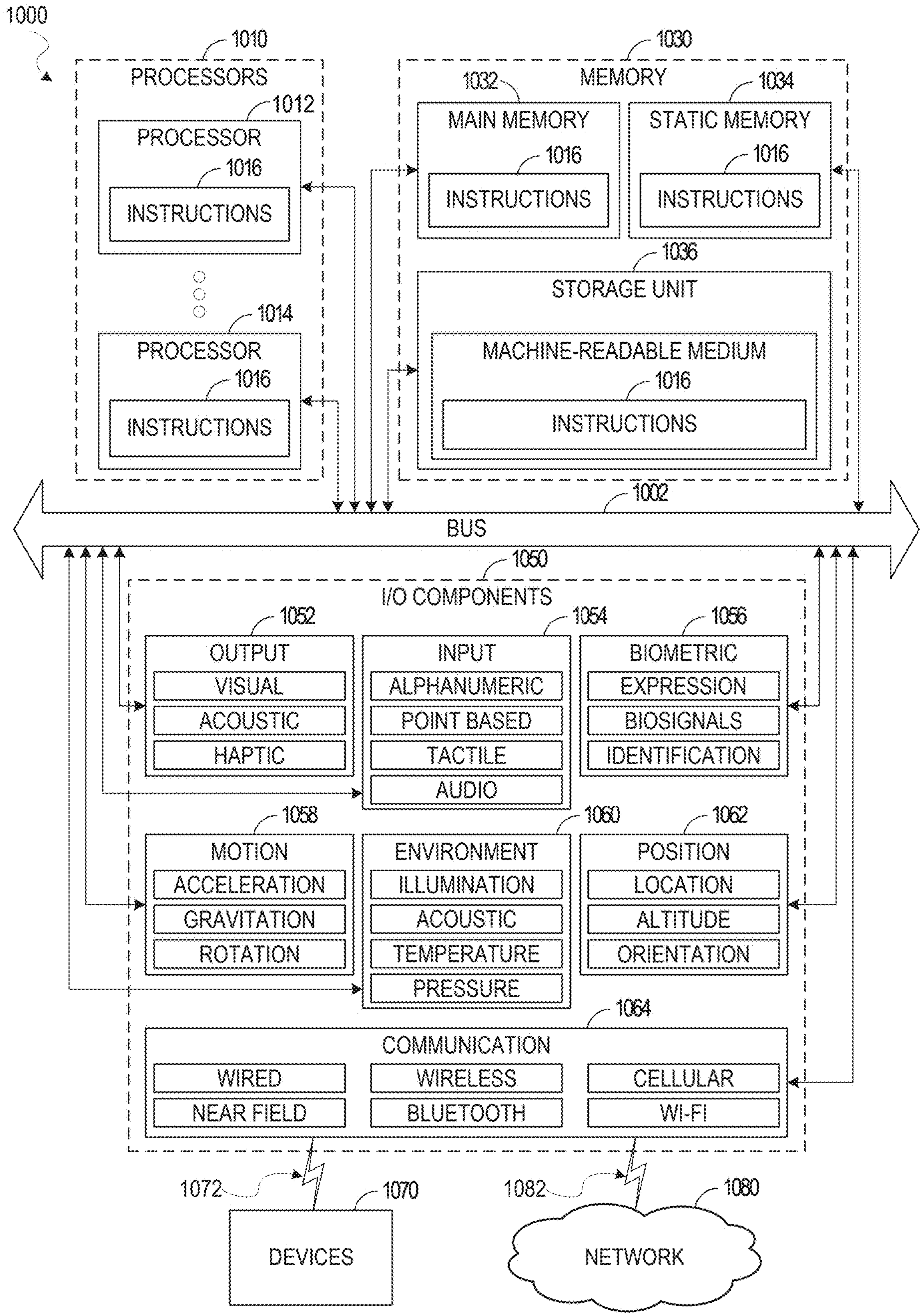
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) cause the machine 1000 to perform any one or more of the methodologies discussed herein to be executed. For example, the instructions 1016 may cause the machine 1000 to execute the method 800 of FIG. 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

one or more image data sources;

a computer system comprising at least one hardware processor and a non-transitory computer-readable medium storing instructions that, when executed by the at least one hardware processor, cause the at least one hardware processor to perform operations comprising:

accessing a label mask for an image and a predicted mask for the image, the predicted mask generated by a defect detection machine learning model as an indicator of whether the image depicts a product having one or more defects, the label mask having labeled areas indicating one or more defects; (step 802)

isolating one or more ground truth contours in the label mask and one or more predicted contours in the predicted mask; (step 804)

for each predicted contour:

for each ground truth contour:

in response to a determination that an intersection over prediction metric for a corresponding ground truth contour and corresponding predicted contour transgresses a first threshold (yes on step 806), matching the corresponding ground truth contour and corresponding predicted contour (step 812) and assigning a true positive classification to the corresponding predicted contour (step 810);

in response to a determination that a ratio of an unmatched area to a total area of the corresponding ground truth contour transgresses a second threshold (yes step 818), assigning a true positive classification to the corresponding ground truth contour (step 820);

forming a confusion matrix using any true positive classifications assigned to any ground truth contours or predicted contours (step 832); and causing the confusion matrix to be displayed in a user interface.

2. The system of claim 1, wherein the isolation is performed using computer vision.

3. The system of claim 1, wherein the operations further comprise:

in response to a determination that the intersection over prediction metric does not transgress the first threshold, determining whether an intersection over ground truth metric for the corresponding ground truth contour and corresponding predicted contour transgresses a third threshold; and in response to a determination that the intersection over ground truth metric for the corresponding ground truth contour and corresponding predicted contour does not transgress the third threshold, assigning the true positive classification to the corresponding predicted contour.

4. The system of claim 1, wherein the operations further comprise:

assigning a false positive to any predicted contour whose label does not match the a ground truth contour.

5. The system of claim 1, wherein the confusion matrix displays a percentage of true positive labels to positive labels and a percentage of true negative labels to negative labels.

6. The system of claim 1, wherein the operations further comprise retraining the defect detection model based on the confusion matrix.

7. The system of claim 1, wherein the operations further comprise relabeling one or more label masks in training data based on the confusion matrix.

8. A method comprising:

accessing a label mask for an image and a predicted mask for the image, the predicted mask generated by a defect detection machine learning model as an indicator of whether the image depicts a product having one or more defects, the label mask having labeled areas indicating one or more defects;

isolating one or more ground truth contours in the label mask and one or more predicted contours in the predicted mask;

for each predicted contour:
for each ground truth contour:
in response to a determination that an intersection over prediction metric for a corresponding ground truth contour and
corresponding predicted contour transgresses a first threshold, matching the corresponding ground truth contour and corresponding predicted contour and assigning a true positive classification to the corresponding predicted contour;
in response to a determination that a ratio of an unmatched area to a total area of the corresponding ground truth contour transgresses a second threshold, assigning the true positive classification to the corresponding ground truth contour;
forming a confusion matrix using any true positive classifications assigned to any ground truth contours or predicted contours; and
causing the confusion matrix to be displayed in a user interface.

9. The method of claim 8, wherein the isolation is performed using computer vision.

10. The method of claim 8, further comprising:
in response to a determination that the intersection over prediction metric does not transgress the first threshold, determining whether an intersection over ground truth metric for the corresponding ground truth contour and corresponding predicted contour transgresses a third threshold; and
in response to a determination that the intersection over ground truth metric for the corresponding ground truth contour and corresponding predicted contour does not transgress the third threshold, assigning the true positive classification to the corresponding predicted contour.

11. The method of claim 8, further comprising:
assigning a false positive to any predicted contour whose label does not match a ground truth contour.

12. The method of claim 8, wherein the confusion matrix displays a percentage of true positive labels to positive labels and a percentage of true negative labels to negative labels.

13. The method of claim 8, further comprising retraining the defect detection model based on the confusion matrix.

14. The method of claim 8, further comprising relabeling one or more label masks in training data based on the confusion matrix.

15. A non-transitory machine-readable storage medium having embodied thereon instructions executable by one or more machines to perform operations comprising:
accessing a label mask for an image and a predicted mask for the image, the predicted mask generated by a defect detection machine learning model as an indicator of whether the image depicts a product having one or more defects, the label mask having labeled areas indicating one or more defects;
isolating one or more ground truth contours in the label mask and one or more predicted contours in the predicted mask;
for each predicted contour:
for each ground truth contour:
in response to a determination that an intersection over prediction metric for a corresponding ground truth contour and
corresponding predicted contour transgresses a first threshold, matching the corresponding ground truth contour and corresponding predicted contour and assigning a true positive classification to the corresponding predicted contour;
in response to a determination that a ratio of an unmatched area to a total area of the corresponding ground truth contour transgresses a second threshold, assigning a true positive classification to the corresponding ground truth contour;
forming a confusion matrix using any true positive classifications assigned to any ground truth contours or predicted contours; and
causing the confusion matrix to be displayed in a user interface.

16. The non-transitory machine-readable storage medium of claim 15, wherein the isolation is performed using computer vision.

17. The non-transitory machine-readable storage medium of claim 15, wherein the operations further comprise:
in response to a determination that the intersection over prediction metric does not transgress the first threshold, determining whether an intersection over ground truth metric for the corresponding ground truth contour and corresponding predicted contour transgresses a third threshold; and
in response to a determination that the intersection over ground truth metric for the corresponding ground truth contour and corresponding predicted contour does not transgress the third threshold, assigning the true positive classification to the corresponding predicted contour.

18. The non-transitory machine-readable storage medium of claim 15, wherein the operations further comprise:
assigning a false positive to any predicted contour whose label does not match a ground truth contour.

19. The non-transitory machine-readable storage medium of claim 15, wherein the confusion matrix displays a percentage of true positive labels to positive labels and a percentage of true negative labels to negative labels.

20. The non-transitory machine-readable storage medium of claim 15, wherein the operations further comprise retraining the defect detection model based on the confusion matrix.

* * * * *